UNITED STATES PATENT OFFICE.

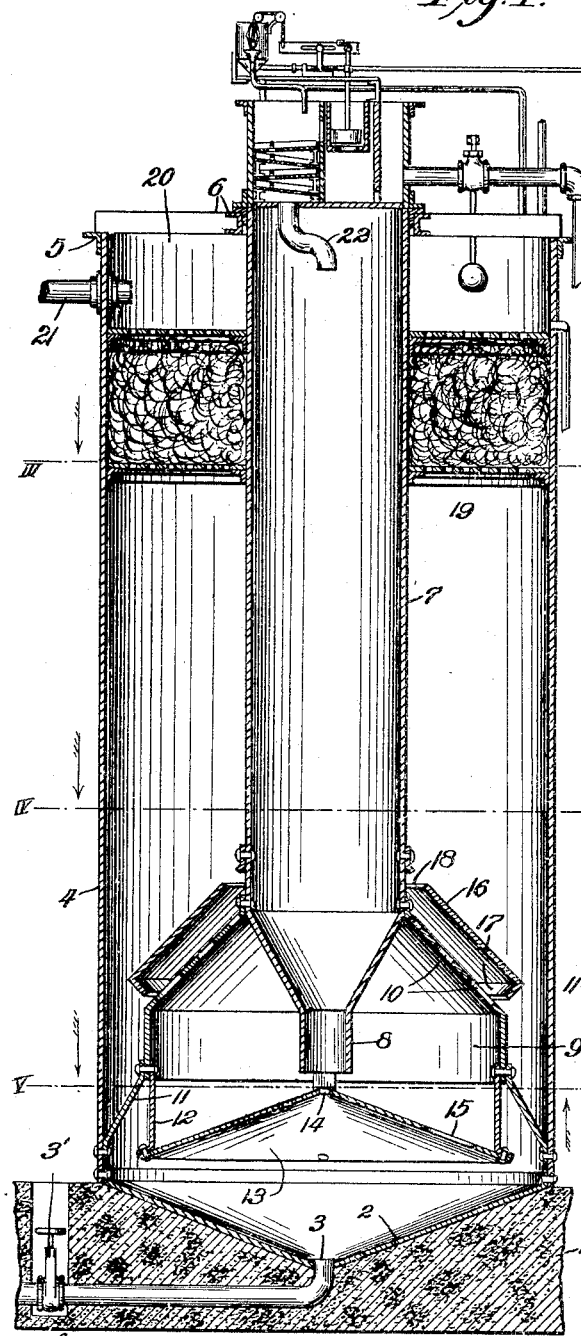
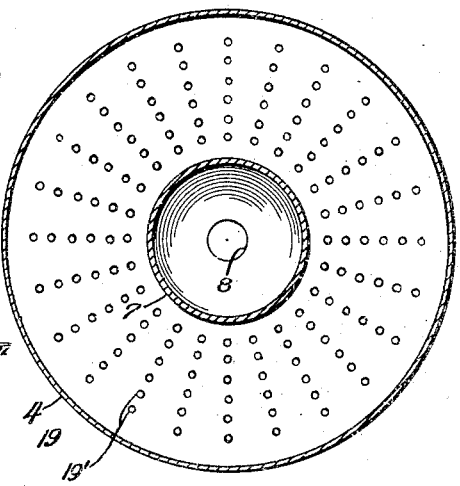
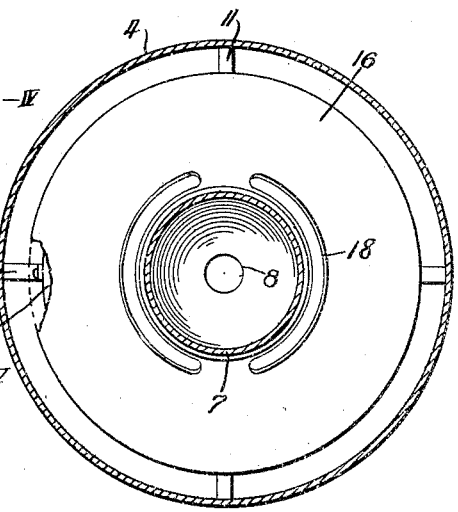

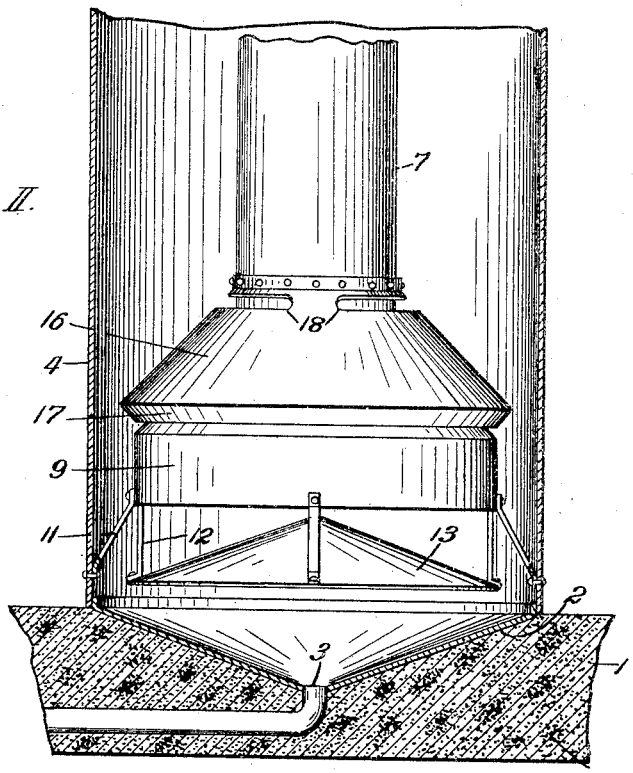
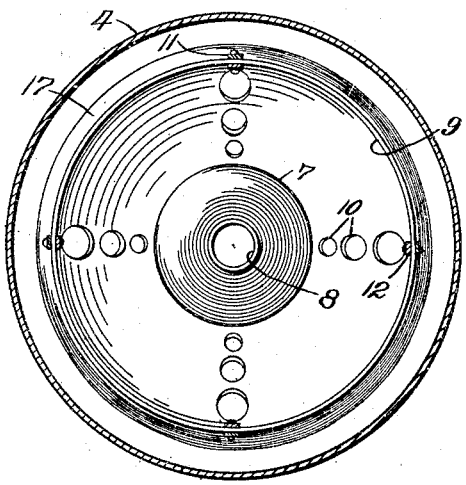
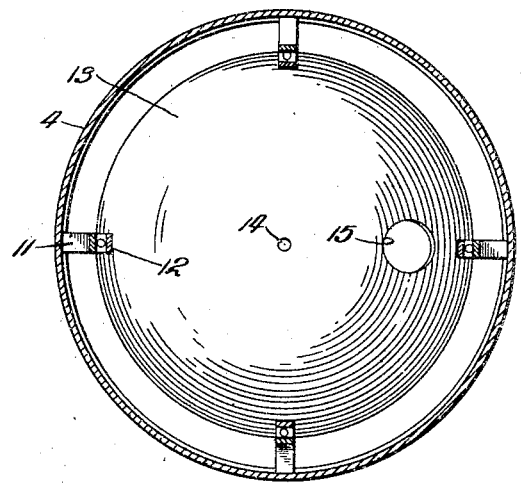

HEZEKIAH RUSSELL, OF DAYTON, OHIO.

WATER-SOFTENING APPARATUS.

958,832.  Specification of Letters Patent.  Patented May 24, 1910.

Application filed April 7, 1909. Serial No. 488,441.

*To all whom it may concern:*

Be it known that I, HEZEKIAH RUSSELL, a subject of Great Britain, residing at Dayton, in the county of Montgomery and State of Ohio, have invented certain new and useful Improvements in Water-Softening Apparatus; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to a water softening apparatus and more particularly to an apparatus of that class wherein an uninterrupted purifying and softening action may be had upon a volume of water which is continuously passing therethrough.

The softening process which I use is one well known in the art and consists of treating hard water by solutions or suitable chemicals, usually lime and soda ash, in order to precipitate the elements that are carried in and give the water its hardness, in order that such elements may be collected in the bottom of a settling tank and removed therefrom as sludge.

While I have mentioned lime and soda ash solutions as used for the softening process, other well known solutions may be used under certain conditions of water, but as these named are the most commonly used, I will describe my apparatus as adapted merely for the use of these two chemicals although it is equally adapted for others.

It is the principal object of my present invention to provide a precipitating and settling tank wherein the precipitates may be separated from the constantly flowing volume of water.

A further object is to provide a filter for collecting the particles which are too light to settle during the main separation.

A further object is to so combine and arrange the parts above mentioned as to form an apparatus that is economical in construction and operation; such an apparatus being fully described in this specification and illustrated in the accompanying drawings in which:—

Figure I is a central vertical section of an apparatus constructed according to my invention. Fig. II is a side elevation of the lower portion of the apparatus, the tank casing being in vertical section to illustrate the interior parts. Fig. III is a horizontal sectional view on the line III—III, Fig. I, showing the lower filter plate. Fig. IV is a horizontal sectional view on the line IV—IV, Fig. I. Fig. V is an inverted plan view on the line V—V, Fig. I. Fig. VI is is a horizontal sectional view on the line V—V, Fig. I.

Referring more in detail to the parts:— 1 designates a foundation of a suitable material, here shown to be of concrete and having a cone shaped recess 2 which is preferably lined to form the bottom of my settling tank, which bottom is provided with the sludge out take pipe 3, having a valve 3'. Rising from the bottom 2 is a tank casing 4, the top of which is preferably open and provided with a stiffening flange 5.

6 designates cross beams which are supported on the top of casing 4, and 7 designates a downtake pipe which is supported by beams 6 and depends in the center of the chamber inclosed by said casing, the lower end of the pipe being contracted to substantially a funnel shape and provided with a discharge cylinder 8. Attached to the downtake pipe, immediately above the funnel end, is a hood 9, having a conical top provided with apertures 10, and a cylindrical base portion which terminates slightly below the lower body of the discharge cylinder 8, the apertures 10 being preferably arranged in longitudinal rows and decreasing in diameter as they approach the upper end of the funnel top.

11 designates legs which are fixed to the lower edge of the hood 9 and extend outwardly and downwardly to the casing 4 and serve to retain the hood and downtake pipe in proper position and assist in supporting such parts. Suspended from the hood 9, by legs 12, is a conical baffle 13, the apex of which is located beneath the discharge cylinder 8, of the downtake pipe, and provided with an aperture 14.

15 designates a manhole in said baffle through which entrance may be had to the chamber formed between the baffle and the tank bottom.

Secured to the downtake pipe 7, above hood 9, is a baffle 16, the edge of which extends outwardly and downwardly preferably parallel with the top of hood 9, and has the down-turned edge flange 17 which terminates slightly above the hood top, below the lowest aperture 10, so that liquid rising in the hood is delivered through said apertures to the chamber between the hood top and baffle.

18 designates arcuate slots which are located in the body of the baffle 16 adjacent to the downtake pipe and through which the liquid may escape into the main tank chamber.

Supported by casing 4 and downtake pipe 7, near the bottom of the tank, are filter plates 19, each of which is provided with perforations 19′ through which the liquid may rise and between which is a packing of fine excelsior, or like material, through which water may rise into the chamber 20 at the top of the tank, from which the purified water may be drawn off through a pipe 21.

22 designates a feed pipe through which a chemical and raw water mixture is delivered to the downtake pipe 7.

Above the tank and downtake pipe, I illustrate a mixing and proportioning apparatus from which the chemical and raw water mixture is delivered to the pipe 22, but as such parts are described and claimed in my application filed March 20, 1908, and serially numbered 422,195, I will not describe the same in detail.

In using the apparatus, raw water is treated with chemicals adapted for softening same and delivered to the herein described apparatus for precipitation.

Presuming the preliminary steps to have been properly taken, the solution is delivered through the pipe 22 into the downtake pipe 7, the precipitates being carried with the down flowing water toward the contracted lower end of the downtake pipe 7 to escape therethrough into the tank chamber beneath the hood 9.

In passing through the funnel bottom and discharge cylinder 8, the precipitates are brought close together to give them a better opportunity to coagulate, so that they become heavier and fall onto the conical baffle 13 and slide downwardly over the edge thereof onto the inverted conical bottom 2, of the main tank.

While the heavier precipitates coagulate and settle, as described, the lighter precipitates rise with the water, in hood 9, and spread therein, but are again brought together as the water rises through the apertures 10 in the conical hood top, so that they coagulate, as did the heavier precipitates and pass downwardly over the top of the hood and sink to the bottom of the tank.

In order to overcome the tendency of the water to surge in the tank after its discharge through the apertures in the hood top, I provide the baffle 16, against which the streams formed by the discharge of the water through the apertures 10 may strike and break, and provide the baffle with the slots 18, so that the water may spread out and escape into a tank chamber with the least possible agitation. After passing into the main tank chamber, the water rises until it encounters the lower filter plate 19.

Passing through the apertures in plate 19 it encounters the filter bed through which it passes into the purified water chamber 20, the lighter precipitates which have been carried upwardly being held in the filter and the water entering the last named chamber being softened and clarified.

By providing the baffle 13, the head from the downtake pipe 9 is broken before reaching the bottom 2, so that when the valve 3′ is opened to remove the coagulated sludge suction in the pipe 3 will not draw water from the downtake pipe, but will carry off the sludge from the cone bottom 2. By this means a minimum of water is taken from the tank when cleaning the apparatus and the sludge is protected from the agitation which would follow a direct flow of water from the downtake pipe.

I provide the baffle with the opening 14 in its apex, so that when the tank is first filled with water, air is allowed to rise through the aperture and escape from beneath the baffle instead of becoming compressed within the cone and result in the water being forced upwardly in the tank, when the valve 3′ is opened to remove the sludge.

Having thus described my invention, what I claim as new therein and desire to secure by Letters-Patent, is:—

1. In a water softening apparatus, a tank; a perforated, cone shaped baffle plate located in the bottom of said tank with its lower edge set in from the tank sides; a downtake pipe in said tank, having a discharge port located over the apex of said baffle plate, and means for delivering liquid to said pipe.

2. In a water softening apparatus, a tank having a cone bottom, an open bottom downtake pipe supported in said tank with its lower end terminating above the tank bottom, a cone shaped baffle plate, having a perforation in its apex, supported in said tank with its apex directed toward the bottom of said pipe, and means for delivering liquid to said pipe.

3. In a water softening apparatus, a tank having a cone bottom, a downtake pipe located in said tank and provided with a contracted lower end, a cylinder on the lower end of said pipe, a perforated, cone shaped baffle plate in the bottom of said tank with its apex directed toward the pipe cylinder and its edges set in from the tank sides, and means for delivering liquid to the upper portion of said pipe.

4. In a water softening apparatus, a tank, a downtake pipe located in and adapted to deliver liquid to the bottom of said tank, a hood located in said tank above the lower end of said pipe, a baffle supported over said hood, and means for delivering liquid to said pipe.

5. In a water softening apparatus, a tank; a downtake pipe located in said tank; a perforated hood supported in said tank above the bottom of said pipe; a slotted baffle supported over said hood, and means for delivering liquid to said pipe.

6. In a water softening apparatus, a tank, a downtake pipe located in said tank, a hood in said tank of greater diameter than and surrounding the lower portion of said pipe and provided with a sloping, perforated top, a baffle sloping downwardly from said pipe and having slots therein adjacent to said drum and having edge flanges projecting downwardly toward said hood, and means for delivering liquid to said pipe.

7. In a water softening apparatus, a tank, a downtake pipe located in said tank, a hood in said tank having a cylindrical body portion of greater diameter than and surrounding the lower portion of said pipe, and having a perforated top extended upwardly and inwardly from the body portion to contact with said pipe, a baffle sloping downwardly from said pipe and having slots adjacent to said drum, downwardly projecting edge flanges on said baffle forming a slot between same and said hood, and means for delivering liquid to said pipe.

8. In a water softening apparatus, a tank, downtake pipe located in said tank, a baffle plate supported by said pipe, a hood supported over said baffle plate, and means for delivering liquid to said pipe.

9. In a water softening apparatus, a tank, a downtake pipe located in said tank and having a discharge port in its lower end, a hood carried by said pipe above the pipe bottom, a baffle plate carried by said hood and extending under said pipe, and means for delivering liquid to said pipe.

10. In a water softening apparatus, a tank, a downtake pipe located in said tank and having a discharge port in its lower end, a hood carried by said pipe and comprising a cylindrical body and perforated, sloping top; a baffle plate carried by the hood body and extending beneath said pipe, and means for delivering liquid to said pipe.

11. In a water softening apparatus, a tank, a downtake pipe located in said tank and having a discharge port in its lower end, a hood suspended from said pipe, a conical baffle plate suspended from said hood and having an aperture in its apex, and means for delivering liquid to said pipe.

In testimony whereof I affix my signature in presence of two witnesses.

HEZEKIAH RUSSELL.

Witnesses:
 MARY ANDERSON,
 JOSEPH S. BROWER.